(12) United States Patent
Kondoh

(10) Patent No.: US 10,289,569 B2
(45) Date of Patent: May 14, 2019

(54) INFORMATION PROCESSING DEVICE AND PROCESSOR

(71) Applicant: Renesas Electronics Corporation, Tokyo (JP)

(72) Inventor: Yuki Kondoh, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/791,687

(22) Filed: Oct. 24, 2017

(65) Prior Publication Data

US 2018/0046587 A1 Feb. 15, 2018

Related U.S. Application Data

(63) Continuation of application No. 12/892,645, filed on Sep. 28, 2010, now Pat. No. 9,798,679, which is a continuation of application No. 12/176,714, filed on Jul. 21, 2008, now abandoned, which is a continuation of application No. 10/838,240, filed on May 5, 2004, now Pat. No. 7,404,054.

(30) Foreign Application Priority Data

May 6, 2003 (JP) ................................ 2003-127638

(51) Int. Cl.
*G06F 12/02* (2006.01)
*G06F 12/14* (2006.01)

(52) U.S. Cl.
CPC ...... *G06F 12/1441* (2013.01); *G06F 12/1425* (2013.01)

(58) Field of Classification Search
CPC .......................... G06F 12/1425; G06F 12/1441
See application file for complete search history.

(56) References Cited

U.S. PATENT DOCUMENTS

| | | | |
|---|---|---|---|
| 4,899,129 A | 2/1990 | MacFadyen et al. |
| 5,325,499 A | 6/1994 | Kummer et al. |
| 5,396,471 A | 3/1995 | Kitsu |
| 5,448,703 A | 9/1995 | Amini et al. |
| 5,659,690 A | 8/1997 | Stuber et al. |
| 5,875,310 A | 2/1999 | Buckland et al. |

(Continued)

FOREIGN PATENT DOCUMENTS

| | | |
|---|---|---|
| JP | 62071749 | 4/1988 |
| JP | 01287762 | 11/1989 |

(Continued)

*Primary Examiner* — Charles Rones
*Assistant Examiner* — Ryan Dare
(74) *Attorney, Agent, or Firm* — Gregory E. Montone; Roberts Mlotkowski Safran Cole & Calderon, P.C.

(57) ABSTRACT

An illegal address access blocking circuit includes a first register and a second register to set upper and lower limit values of an address range within which access to an external device is allowed. A first comparator compares a first value and the upper limit value, and outputs a high level signal when the first value is larger than the upper limit value. A second comparator compares the first value and the lower limit value, and outputs a low level signal. A first and logic circuit holds a logic sum of the high and low level signals, and outputs the logic sum as a third output, and a second logic circuit compares a fourth value inputted to a first request control line and the third output, and outputs a result of the comparison to a second request control line.

7 Claims, 10 Drawing Sheets

(56) References Cited

U.S. PATENT DOCUMENTS

| | | |
|---|---|---|
| 5,983,306 A | 11/1999 | Corrigan et al. |
| 6,052,756 A | 4/2000 | Barnaby et al. |
| 6,175,888 B1 | 1/2001 | Guthrie et al. |
| 6,182,178 B1 | 1/2001 | Kelley et al. |
| 6,202,154 B1 | 3/2001 | Suzuki et al. |
| 6,233,667 B1 | 5/2001 | Shaylor et al. |
| 6,311,255 B1 | 10/2001 | Sadana |
| 6,519,690 B1 | 2/2003 | Quimby |
| 6,629,162 B1 | 9/2003 | Arndt et al. |
| 6,701,397 B1 | 3/2004 | Foster et al. |
| 6,944,686 B2 | 9/2005 | Naruse et al. |
| 7,246,052 B2 | 7/2007 | Shamoto et al. |
| 2002/0062414 A1 | 5/2002 | Hofmann et al. |
| 2003/0048677 A1 | 3/2003 | Muneno |
| 2004/0103230 A1 | 5/2004 | Emerson et al. |

FOREIGN PATENT DOCUMENTS

| | | |
|---|---|---|
| JP | 01295596 | 11/1989 |
| JP | 03184182 | 8/1991 |
| JP | 04119447 | 4/1992 |
| JP | 06282495 | 10/1994 |
| JP | 09134193 | 5/1997 |
| JP | 09297711 | 11/1997 |
| JP | 10289194 | 10/1998 |
| JP | 2000-276397 | 10/2000 |
| JP | 2001243174 | 9/2001 |
| JP | 2001290762 | 10/2001 |
| JP | 2002032352 | 1/2002 |
| JP | 2002149593 | 5/2002 |
| JP | 2002351747 | 12/2002 |
| JP | 2003005916 | 1/2003 |
| JP | 2003085127 | 3/2003 |
| JP | 2003114864 | 4/2003 |

INFORMATION PROCESSING DEVICE AND PROCESSOR

CROSS REFERENCE TO RELATED APPLICATION

This is a Continuation of U.S. patent application Ser. No. 12/892,645, filed Sep. 28, 2010, which is a Continuation of U.S. patent application Ser. No. 12/176,714, filed Jul. 21, 2008, which is a Continuation of U.S. application Ser. No. 10/838,240, filed May 5, 2004, now U.S. Pat. No. 7,404,054, which claims priority from Japanese Patent Application No. 2003-127638, filed on May 6, 2003, the contents of which are incorporated herein by reference.

FIELD OF THE INVENTION

The present invention relates to information processing devices and, in particular, to processors utilized in central processing devices in computers.

BACKGROUND OF THE INVENTION

Modern processors, especially in microcomputers built into equipment, utilize a system with a one chip processor made up of a CPU for general processing tasks and a multiple peripheral IP for special processing tasks all mounted on a single chip. This type of system typically has a structure where multiple devices, such as the CPU and the peripheral IP, are connected to a bus within a processor. These types of systems, in particular, contain multiple bus master devices for issuing access requests to the bus.

The bus master device in a processor containing a CPU sometimes accesses the bus unintentionally due to: (1) software bugs, (2) hardware bugs, and (3) temporary hardware problems (such as software errors on the a line). This type of access is called illegal address accessing. Product defects due to software bugs caused by illegal address accessing are especially numerous in built-in equipment applications.

To illustrate those cases in an application of the present invention where illegal address accessing has occurred, an example will be considered here which involves a system with multiple bus masters for image input and processing. The system structure is shown in FIG. 10. Here, the reference numeral 810 denotes the image input section and numeral 830 denotes the memory. The image input section 810 and the memory 830 are both connected to the system bus 800. The image input section 810, for example, loads images from a camera and stores that data in the memory 830 by operating a bus master. The numeral 850 indicates the flow of data during that operation.

The reference numeral 820 denotes the image processor section for performing color correction and noise elimination. The image processor section 820 loads image data from the memory 830 and writes back the processing results. The numerals 851 and 852 respectively indicate the flow of data.

The memory writing 850 from the image input section 810, and the memory writing 852 from the image processor section 820 must be performed in parallel. Therefore, switching must be performed to prevent conflicts arising from both accesses (850 and 852) to the memory area (at the same time).

FIG. 11 is a memory map of the system shown in FIG. 10. The section shown in area 910 is the area for the memory 830. In order to operate the image input section 810 and the image processor section 820 in parallel and avoid conflicts in the memory area, the image input section 810 must write in area 921 of area 910 and the image processor section 820 must write in area 920 thereof within a time period T. In the same way, the respective areas 922 and 921 must be written in T+1, and the areas 920 and 922 must be written in T+2.

The above-mentioned memory area switching which is employed to avoid conflicts in the memory area is especially important in systems having multiple bus masters. When conflicts in the memory area occur, for example, due to control software bugs, the problem occurs that image data cannot be processed correctly.

The CPU core typifying the bus master device contains a device called the MMU (Memory Management Unit). The MMU both detects and blocks illegal address accessing. However, the peripheral IP generally does not contain an MMU. A typical MMU used here with a peripheral IP also converts virtual addresses within the CPU core into actual addresses so that using the MMU for blocking illegal address accessing requires a large overhead in terms of the number of circuits and the software overhead to handle these circuits. The MMU therefore cannot be used for detecting and blocking illegal address accessing from a peripheral IP.

SUMMARY OF THE INVENTION

The present invention, therefore, has the object of providing a device to detect and block illegal address accessing with a small circuit overhead. The unique features of the present invention to achieve this and other objects will become apparent from the description provided in the present specification and the accompanying drawings.

A brief description of a typical embodiment of the invention is as follows. An information processing device has a first bus master device and a first slave device, and a bus is connected to that first bus master device and first slave device, wherein when the first bus master device accesses the first slave device, a first illegal address blocking circuit detects and blocks illegal access from the first bus master device.

More preferably, the first illegal address blocking circuit contains a range setting register that is set with an address prohibit range.

Still more preferably, range setting register is constituted by a first register holding an upper address limit for addresses assigned to the first slave device and a second register holding a lower address limit, and the first illegal address blocking circuit contains a comparator circuit to determine if the address output from the first bus master device is included in the address range defined by the values contained in the first register and the second register.

DETAILED DESCRIPTION OF THE PREFERRED EMBODIMENTS

Preferred embodiments of the information processing device of the present invention will be described with reference to the accompanying drawings. Though there are no special restrictions, the circuit elements comprising each block of an embodiment are known semiconductor integrated circuits, such as bipolar transistors and CMOS (complementary metal-oxide semiconductor) devices, formed on a single semiconductor substrate of monocrystalline silicon.

First Embodiment

Figure 1:
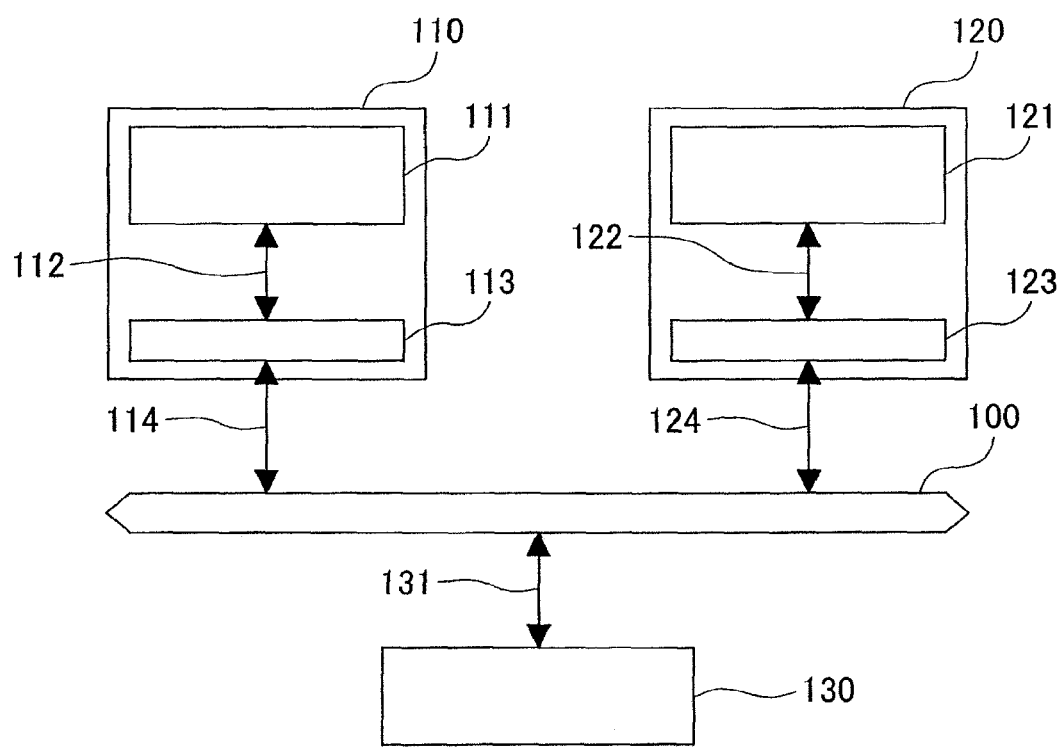
FIG. 1 is a block diagram showing the system structure of a first embodiment of the present invention.
Figure 2:
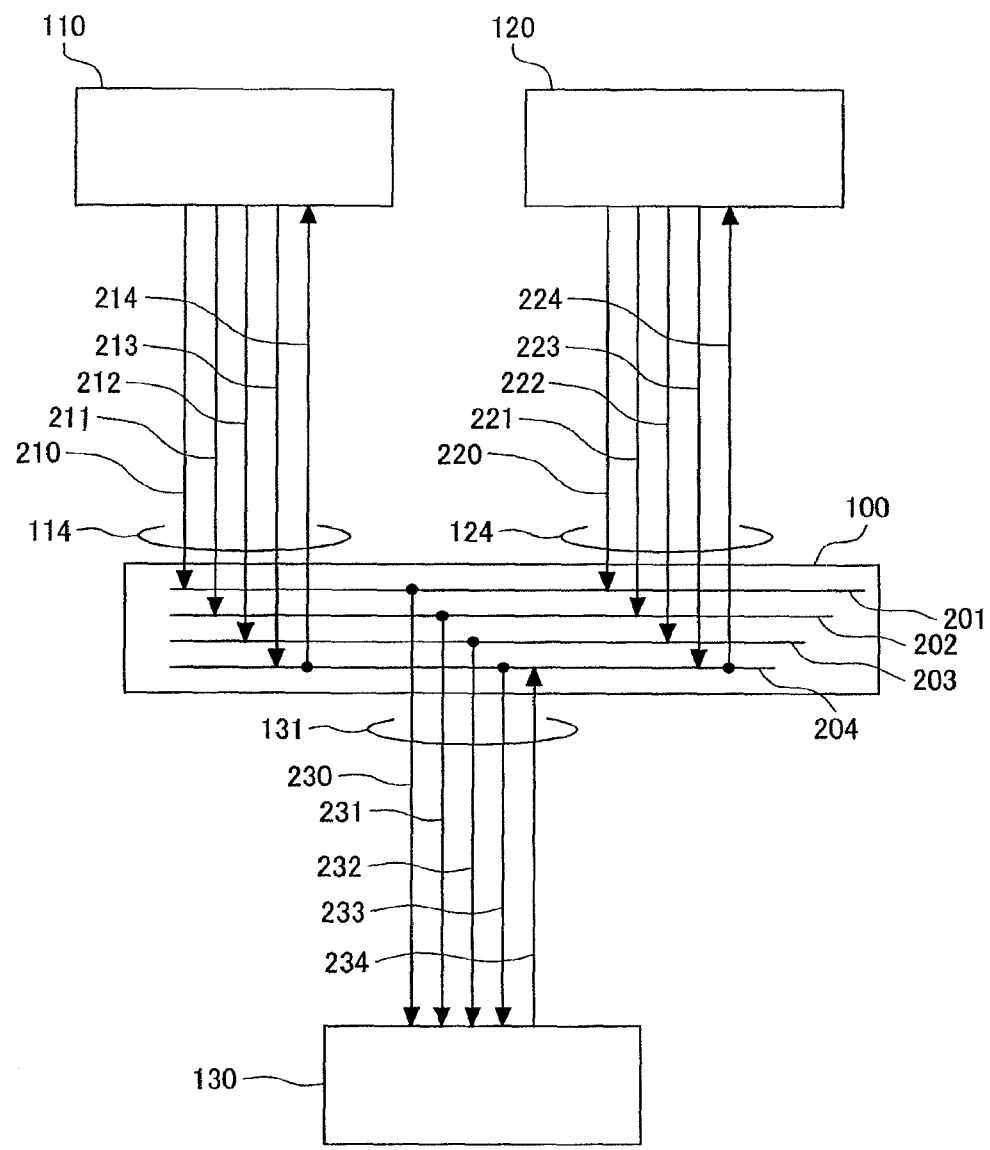
FIG. 2 is schematic diagram showing device connections and the bus configuration of the first embodiment.
Figure 3:
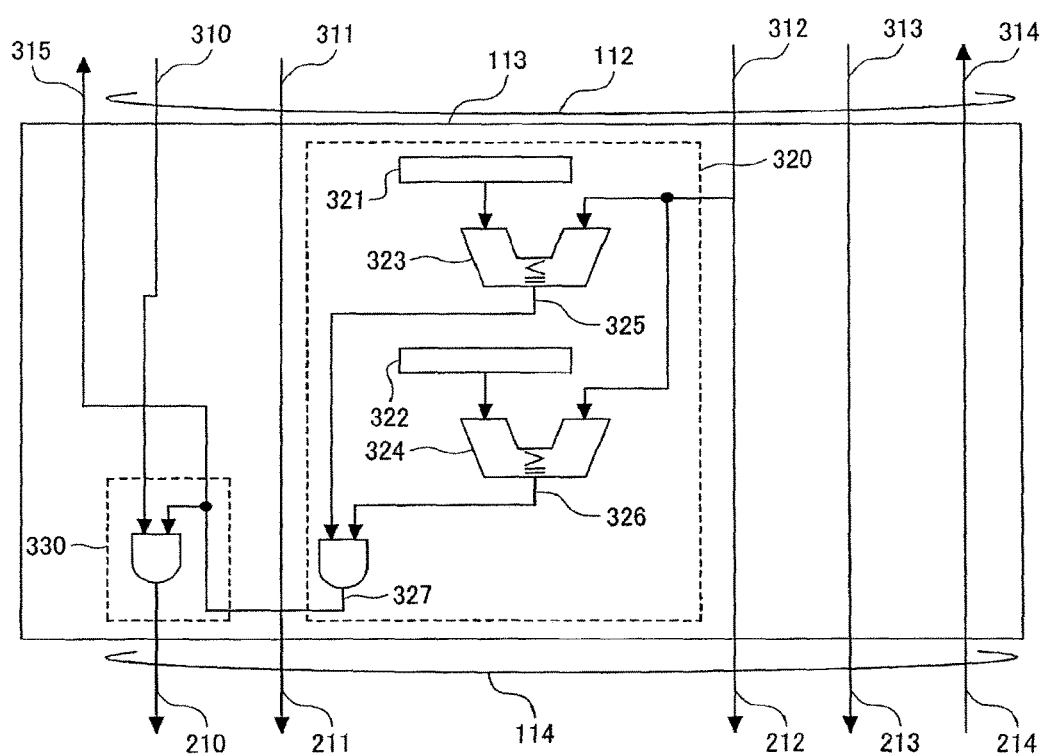
FIG. 3 is a schematic diagram of the illegal address access blocking circuit of the first embodiment.

A first embodiment of the present invention is shown in FIG. 1 through FIG. 3. This embodiment utilizes a bus configuration with multiple devices jointly using control lines, data lines and address lines as the system bus structure.

FIG. 1 is a simplified view of the overall system structure of the present embodiment. Though there are no particular restrictions, the components are all formed on one semiconductor substrate. The reference numeral 100 denotes the system bus within the processor, and it is composed of control lines, data lines and address lines shared by multiple devices. The reference numerals 110 and 120 denote bus master devices for accessing other devices via the system bus 100. The reference numeral 130 denotes a slave device for accepting requests via the system bus 100 of the master devices 110, 120 and sending back responses to the system bus 100.

The example for this system configuration comprises two bus master devices made up of an audio processing IP and an image processing IP. In this system, the respective processing results from these bus master devices are written into the slave device constituting the serial interface.

The present embodiment is also assumed to be a system with two bus master devices and one slave device. However, the method of the present invention is not limited by the type or number of devices. The reference numerals 111 and 121 respectively denote main circuits of the bus master device. The reference numerals 113 and 123 denote the illegal address access blocking circuits of the present invention. These illegal address access blocking circuits 113 and 123 are connected to the main circuits 111, 113 of the bus master devices via connecting lines 112, 122. These illegal address access blocking circuits 113 and 123 also are connected to the system bus 100 via the connecting lines 114, 124. The slave device 130 is connected to the system bus 100 via the connecting line 131. Though described later, when the bus master device is accessing the slave device, the illegal address access blocking circuits 113 and 123 function to detect illegal accessing of the bus master devices and block access.

FIG. 2 is a diagram showing the connections of the system bus 100 itself, as well as the interconnections between the system bus 100 and the connecting lines 114, 124, and 131.

The connecting line 114 connecting the bus master device 110 and the system bus 100 is composed of a request control line 210, a read/write enable signal line 211, an address line 212, a write data line 213, and a read data line 214.

Though there are no particular restrictions on the request control line 210, an "H" here indicates a request and an "L" indicates no request. When the request control line 210 is "H", then the read/write enable signal line 211 identifiers a read request with a "H" and a write request with an "L", and the address line 212 provides the address for reading/writing. During a write request, the write data is output from the write data line 213. During a read request, the data is input from the read data line 214.

The connecting line 124 that connects the bus master device 120 to the system bus 100 has the same structure as the connecting line 114. The request control lines 210 through 214 respectively correspond in function to the lines 220 through 224.

The connecting line 131, which connects the slave device 130 with the system bus 100, is composed of a request control line 230, a read/write enable signal line 231, an address line 232, a write data line 233, and a read data line 234. Here for example, an output from the request control line 210 is conveyed to the request control line 230. Data from the write data line 233 is input to the slave device via the connecting line 131, or data is output to the read data line 234.

FIG. 3 is a schematic diagram showing the illegal address access blocking circuit 113 contained in the bus master device 110 of the present invention. The illegal address access blocking circuit 123 contained in the bus master device 120 is identical in structure. The signal lines 310 through 314 comprise the connecting line 112, and they respectively correspond to the signal lines 210 through 214 that comprise the connecting line 114 to the bus.

The reference numeral 320 denotes an illegal address access detector. The bus master device 110 along with the registers 321 and 322 constitute the range setting register that sets the address range for accessing the slave device 130. The upper limit value of the address range within which access to the bus master device 110 is allowed is stored in the register 321 and the lower limit value is stored in the register 322. Though not specified in the drawing, these registers can be set by way of the control line 112. These registers may also be set by software processing when the power is turned on, or they may be set automatically when it is detected that the power has been turned on.

The reference numerals 323 and 324, respectively, denote comparators. The comparator 323 compares the values of the address line 312 and the content of the register 321. When the value of the address line 312 is the larger value, the comparator 323 outputs an "H" to the signal line 325. The comparator 324 compares the values of the address line 312 and the content of the register 322. When the value of the address line 312 is the smaller value, the comparator 324 outputs an "H" to the signal line 326. Therefore, the signal line 327 holding the logic sum of the signal line 325 and the signal line 326, outputs an "H" when the value of the address line 312 is within the range specified by the register 321 and the register 322.

The reference numeral 330 denotes an illegal address blocking section (circuit). When the output of the control line 327 is "H", or, in other words, when the value of the address line 312 is within the range specified by the register 321 and the register 322, then the output from the request control line 310 is output unchanged to the request control line 210. Conversely, when the output of the signal line 327 is "L", or, in other words, when the value of the address line 312 is outside the allowable access range, the output from the request control line 210 is "L" and illegal address accessing is blocked, even if the output from the request control line 310 is "H". The logic seen on signal line 327 is sent unchanged to the signal line 315, and the bus master device main circuit 111 is notified of the blocking of an illegal address access. Illegal address accessing can be prevented in this way. In the present embodiment, the registers 321, 322 as well as the comparators 323, 326 are one set. Needless to say, however, when there are many slave devices, the number of registers and comparators can be increased according to the number of slave devices. Also, the address locations within the registers 321, 322 may be configured to store all bits representing the address, or they may be configured to store only a portion. In other words, these can be set within a range where access control is needed. For example, if it is desired to detect illegal addresses in a range from H'08000000 to H'0BFFFFFF within the address space of the corresponding slave device, then only the upper eight bits need to be set. Making this setting makes it possible to reduce the size of the registers 321, 322 and the comparators 323, 326 to achieve a smaller surface area (save space). A configuration where the registers 321, 322 are settable to 32 bits may also be used. In this case, a narrower range can be set for detecting an illegal address, and it can easily be used with multiple slave devices having different address range sizes.

Figure 4:
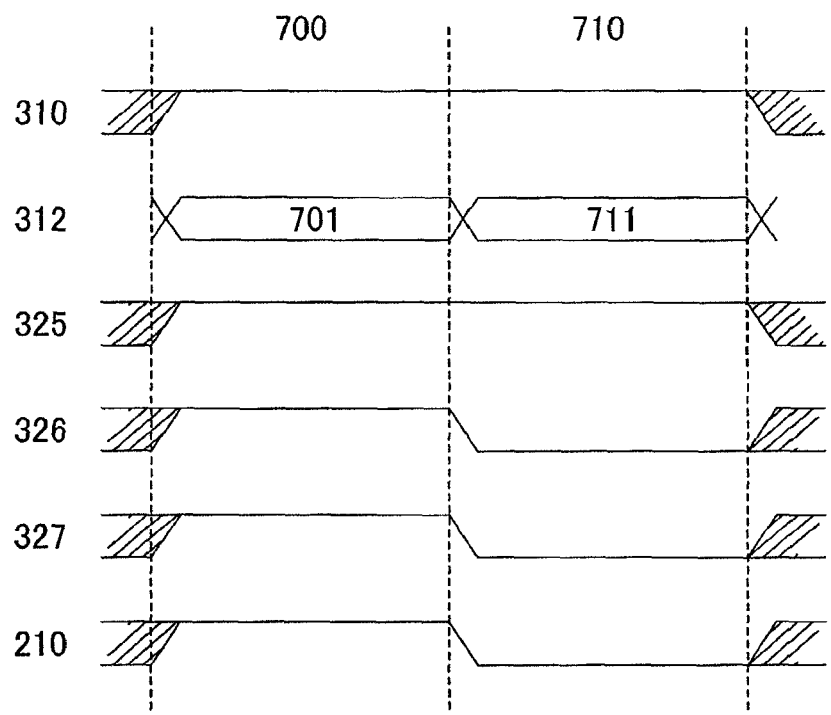
FIG. 4 is a timing diagram showing the operation of the illegal address access blocking circuit.

FIG. 4 is a timing chart showing the operation which is carried out when normal address accessing and illegal address accessing have occurred in a processor having an illegal address access blocking function. The reference numerals 700 and 710 in the figure indicate one clock period. During this period, the request control signals 310, 210, the address line 312, as well as the internal signals 325, 326, 327 of the illegal address access blocking device 320 transition to different states.

During the period 700, the value 701 of address line 312 is within the range set in the registers 321, 322. The signals 325, 326 are set to "H" at this time, and the signal 327 also is set to "H". Therefore, a signal level of request control signal 310 equivalent to "H" is also output to the request control line 210.

In the period 701, the value 702 is set to a value higher than the lower limit value set in the register 322. At this time, the signal 327 is set to "L" when the signal 326 is set to "L". The request control signal line 210 therefore is set to "L" at the request control signal 310 setting to "H", so that illegal address accessing is blocked. There are no particular restrictions on action taken when it is determined that illegal address accessing has occurred. For example, a signal line can notify the master device 110 of an interrupt, and action then taken by the master device, or the interrupt, can be detected by software and action can be taken.

An illegal address access blocking device of this type can be implemented with a small number of circuits comprising a minimum structure made up of two registers, two comparators, and two AND gates per a bus master device, such as one peripheral IP. This illegal address access blocking device also will prevent product defects due to software bugs and provides early detection.

Second Embodiment

Figure 5:
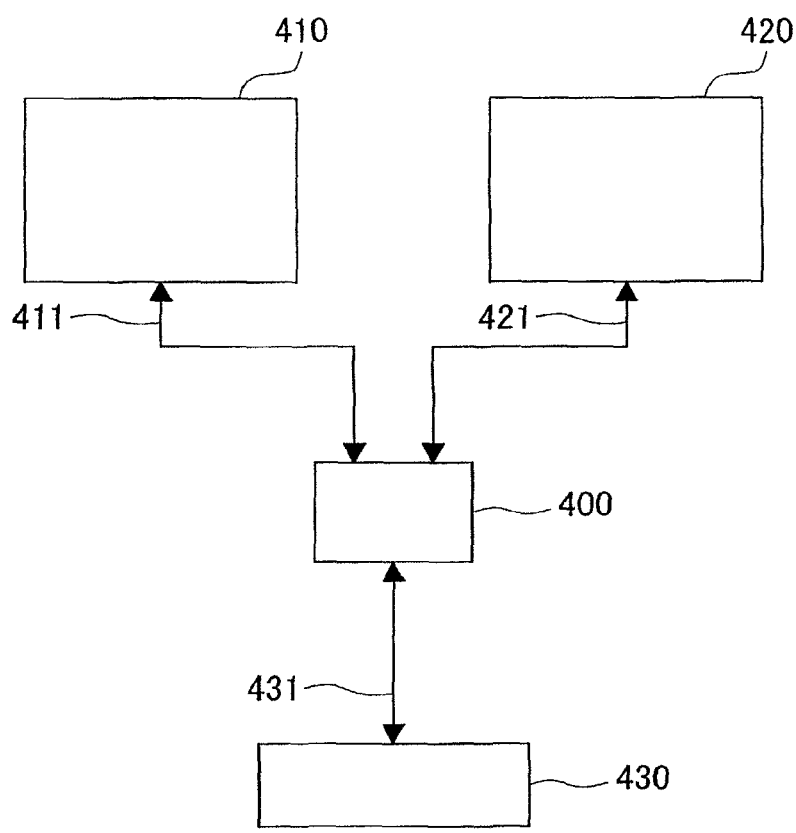
FIG. 5 is a block showing the system structure of a second embodiment of the present invention.
Figure 6:
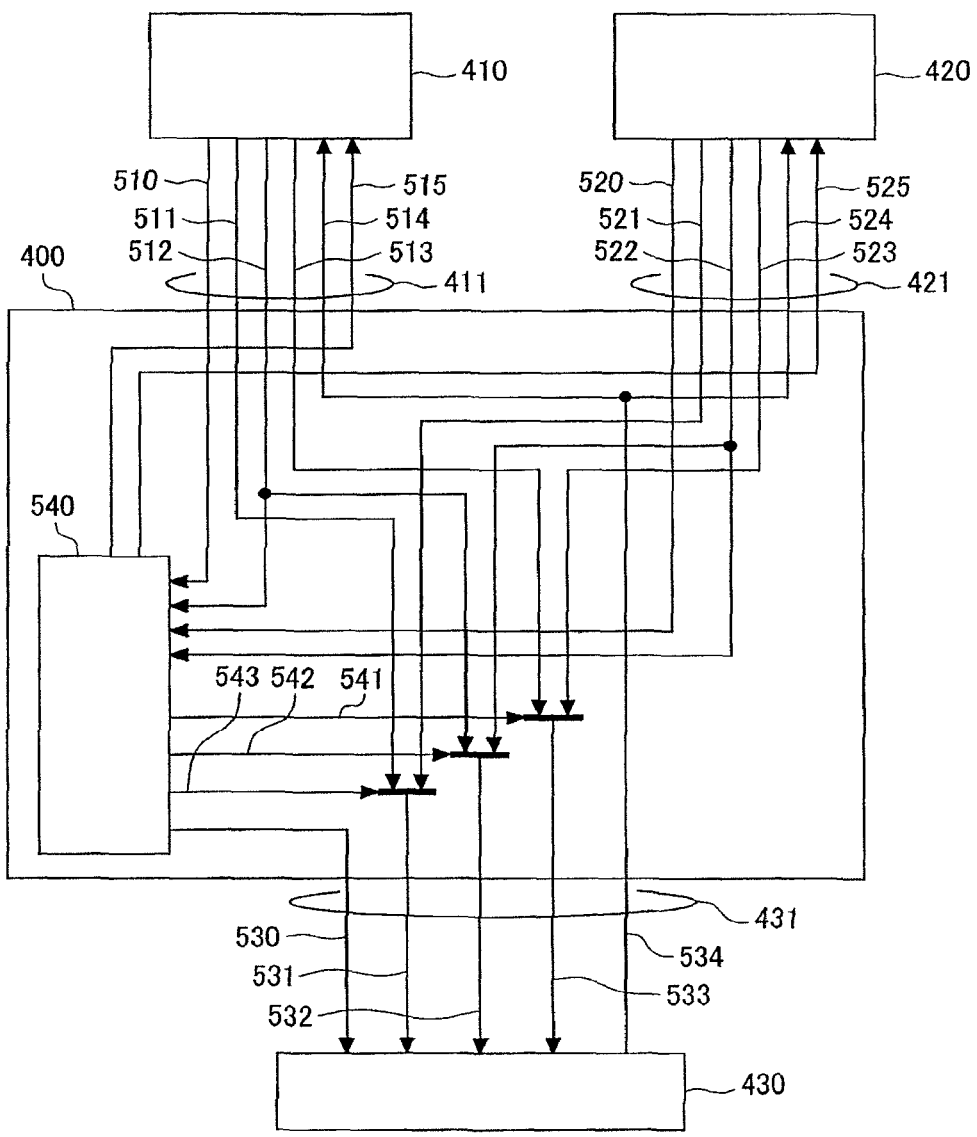
FIG. 6 is a schematic diagram showing device connections and the bus structure of the second embodiment.
Figure 7:
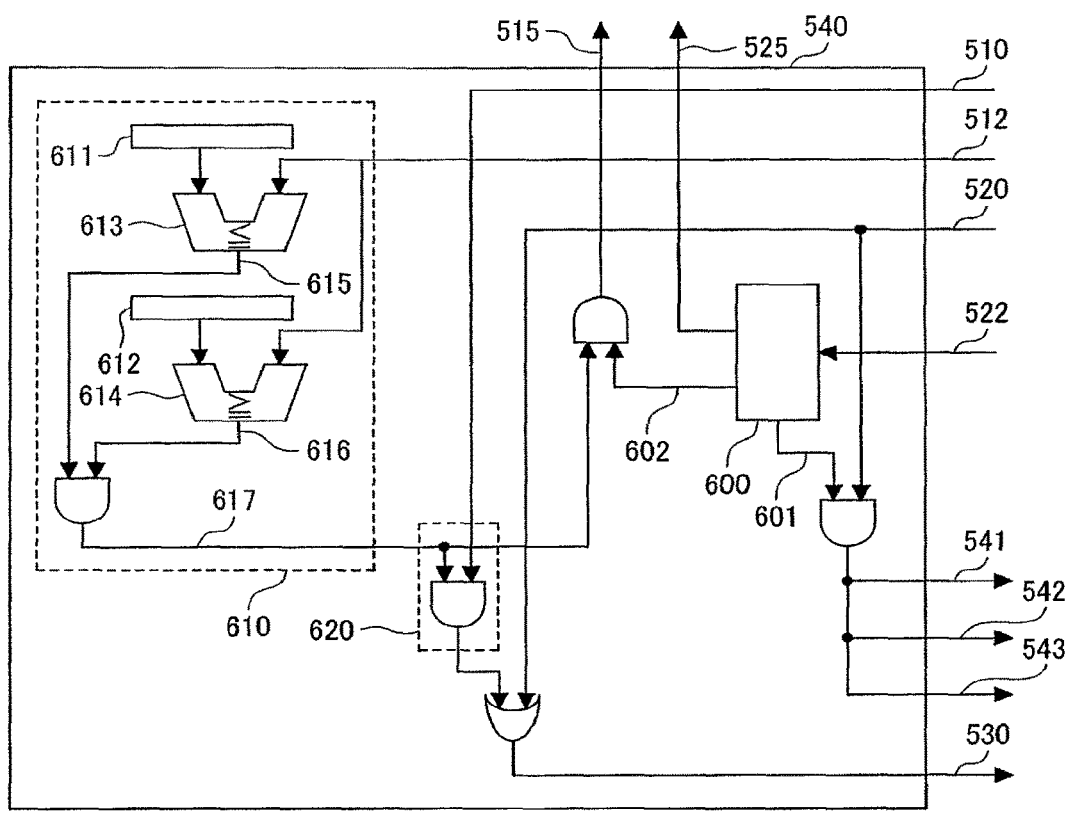
FIG. 7 is a schematic diagram of the illegal address access blocking circuit of the second embodiment.

FIG. 5 through FIG. 7 show another embodiment of the present invention. This embodiment utilizes a switching type (On-chip Star Topological Network) as the system bus structure. This switching type bus structure (On-chip Star Topological Network), for example, has a structure where the connections between the bus master device and slave device are controlled by a selector. Utilizing this type of structure allows the system bus to operate at higher speeds. Hereafter, mainly the sections of the embodiment differing from the first embodiment will be described. Needless to say, the items described for the first embodiment are also applicable to the second embodiment.

FIG. 5 is a diagram showing a simplified form of the system structure as applied to the present invention. The reference numeral 400 denotes a switching type system bus (On-chip Start Topological Network) within the processor. The reference numerals 410 and 420 denote the bus master devices, and 430 denotes the slave device. The bus master devices 410, 420 and the slave device 430 are respectively connected to the system bus 400 by the connecting lines 411, 421, and 431. This method, as with the first embodiment, applies no restrictions on the type or number of connected devices.

FIG. 6 is a diagram showing connections of the system bus 400 itself and the connections between the system bus 400 and the connecting lines 411, 421 and 431. The connecting line 411 connecting the system bus 400 and the bus master device 410 is composed of a request control line 510, a read/write enable signal line 511, an address line 512, a write data line 513, a read data line 514, and a (request) acceptance notification line 515. The description of the lines 510 through 514 matches the lines 210 through 214 in the first embodiment. The signal line 515 indicates whether or not a request from the request control line 510 was accepted. The connecting line 421 connecting the system bus 400 and the bus master device 420 has a structure identical to the connecting line 411.

The connecting line 431 connecting the slave device 430 with the system bus 400 is composed of a request control line 530, a read/write enable signal line 531, an address line 532, a write data line 533, and a read data line 534. The description of each signal line is the same as the lines 230 through 234 of the first embodiment.

Reference numeral 540 denotes the request signal selector (switch). The request control lines 510, 520, and the address lines 512, 522 are input to the request signal selector (switch) 540, and the selector control signal lines 541, 542, and 543, as well as the request control line 530 signals, are output from this selector (switch) 540. When the signal from the selector control signal line 543 is "L", the read/write enable signal line 511 signal is then output to the read/write enable signal line 531. Conversely, when the signal from the selector control signal line 543 is "H", the signal from control line 521 is output to the control line 531.

The signals on line 512 or 522 are output along address line 532 according to the state of the selector control signal line 542, or the signals on address 513 and 523 are respectively output along the data line 533 according to the state of the selector control signal 541 in the same way. The connections between the bus master device 410, 420 and the slave device 430 are switched in this way. This type of configuration allows the system bus 400 to operate at high speed.

FIG. 7 is a diagram showing the internal structure of the control circuit 540. The reference numeral 600 is a decoder which outputs an "H" signal to the signal line 601 when the value on the address line 522 indicates the slave device 430. Therefore, when a request is output to the slave device 430 from the bus master device 420 on the control signal lines 541, 542, 543, the selector outputs a control signal on the 420 side.

When the address destination indicated by the value on line 522 does not indicate the slave device 430, then an "L" signal is output to the signal line 525 and an "H" is output to the signal line 602. In the opposite case, an "L" is output to the signal line 602, and an "H" is output on the signal line 525.

The reference numeral 610 identifies the illegal address access detector. The reference numerals 611 and 612 respectively identify the registers for that detector circuit and reference numerals 613, 614 identify the comparators. The circuit of this illegal address access detector is the same as that of the illegal address access detector 320 of the first embodiment. When the value on the address line 512 is within the range specified by the register 611 and the register 612, the signal line 617 is set to an "H" value. The register 611 and the register 612 can also read/write values by way of the signal line 411.

The reference numeral 620 identifies the illegal address blocking section (or circuit) and is identical to the blocking section 330 of the first embodiment. The blocking section 620 blocks (masks) the request control line 510 when the output from the control line 617 is "L". Illegal address accessing from the bus master device 410 can be blocked in this way. This blocking of the signal line 602 signal by the output from the signal line 617 to prevent illegal address accessing is reported to the bus master device 410. The bus master device 410 receives this notification and performs the necessary processing.

Figure 8:
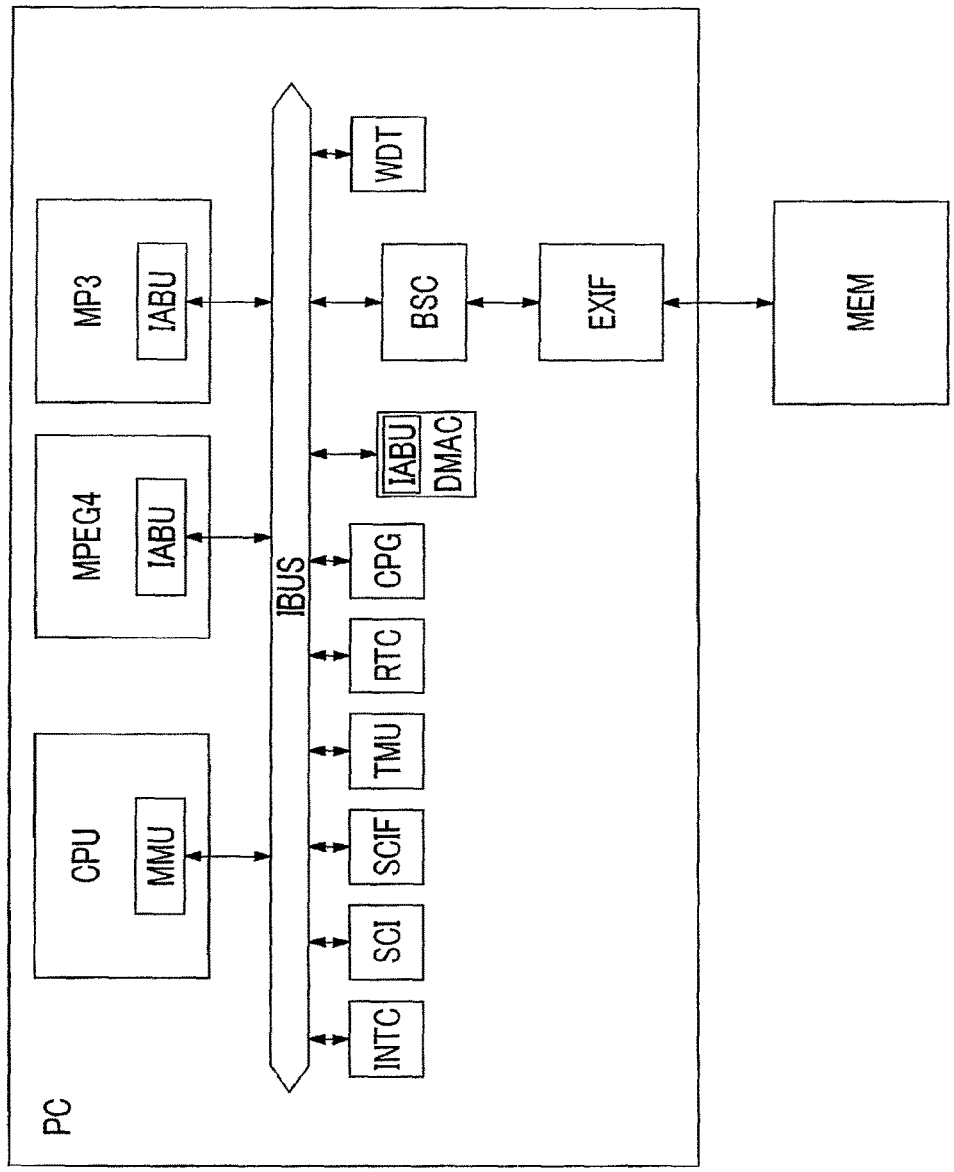
FIG. 8 is a block diagram of the processor for the illegal address access blocking circuit.

The bus master devices 410, 420 must always access the slave device by way of the selector on the system bus 400 so that installing the illegal address blocking circuit in the selector control circuit allows it to be implemented in a small surface area. FIG. 8 is an embodiment in which the invention is applied to a specific processor PC. The processor PC contains a CPU (central processing unit) for controlling the entire processor PC. The MMU (Memory Management Unit) converts the virtual address inside the CPU core to a physical address and also contains a function to block illegal address accessing. In the processor PC in the present embodiment, the bus master device is composed of a CPU, a direct memory access controller DMAC, a dedicated image processor IP (device) MPEG4, and a dedicated audio processor IP (device) MP3. The processor PC carries out external access by using an external bus interface circuit EXIF that is connected to the bus state controller 5 by way of the processor internal main network (or internal bus IBUS). The external bus interface circuit EXIF is connected to the external memory MEM. The bus state controller BSC outputs strobe signals RAS, CAS and a write enable signal WE to the memory MEM installed externally.

The processor PC contains a clock pulse generator CPG, an interrupt control circuit INTC, a serial communication interface controller SCI, a real-time clock circuit RTC and a timer TMU, which serve as internal peripheral circuits connected to the processor internal main network (or internal bus IBUS). These peripheral circuits are accessed by the CPU or the direct memory access controller DMAC, or the dedicated image processor IP (device) MPEG4, or the dedicated audio processor IP (device) MP3 by way of the processor internal main network (or internal bus IBUS). A clock signal synchronized with the system clock is output from the clock pulse generator CPG. This processor PC performs operations, such as loading external data, while synchronized with this system clock signal.

The bus state controller BSC determines the access data size, access time, and wait state according to the circuit for access (address area to be accessed) by the CPU or direct memory access controller DMAC, and it also controls the bus access to the external memory MEM. The bus state controller BSC also arbitrates competing requests for bus use from external sections and from the direct memory access controller DMAC.

Here, the processor internal main network (or internal bus IBUS) is the bus type (network typology). The illegal address access blocking circuit (IABU) of the present invention is therefore installed in the CPU, direct memory access controller DMAC, dedicated image processor IP (device) MPEG4, or dedicated audio processor IP (device) MP3 that make up the bus master device. Illegal address accessing can therefore be blocked with a small number of circuits, product defects due to software bugs can be prevented, and early stage detection can be achieved. When the processor internal main network (or internal bus IBUS) is of the switch type, illegal accessing can be prevented by installing an illegal address access blocking circuit in the processor internal main network (IBUS), and there is no need to install illegal address access blocking circuits in the direct memory access controller DMAC (and other circuit in the bus master device) so that the required circuits surface area can be reduced.

In circuit design in recent years, the circuits for all types of devices (such as CPU and DMAC) are pre-designed and stored as an IP in design tools. Then, during the actual circuit design stage, these devices that are stored in the design tools and which are needed to make the required product can be combined to create an LSI circuit. In this case, the illegal address access blocking circuit of the present invention can be stored as one IP in the design tool. In this way, the stored illegal address access blocking circuit can be connected easily between each device and the system bus.

Figure 9:
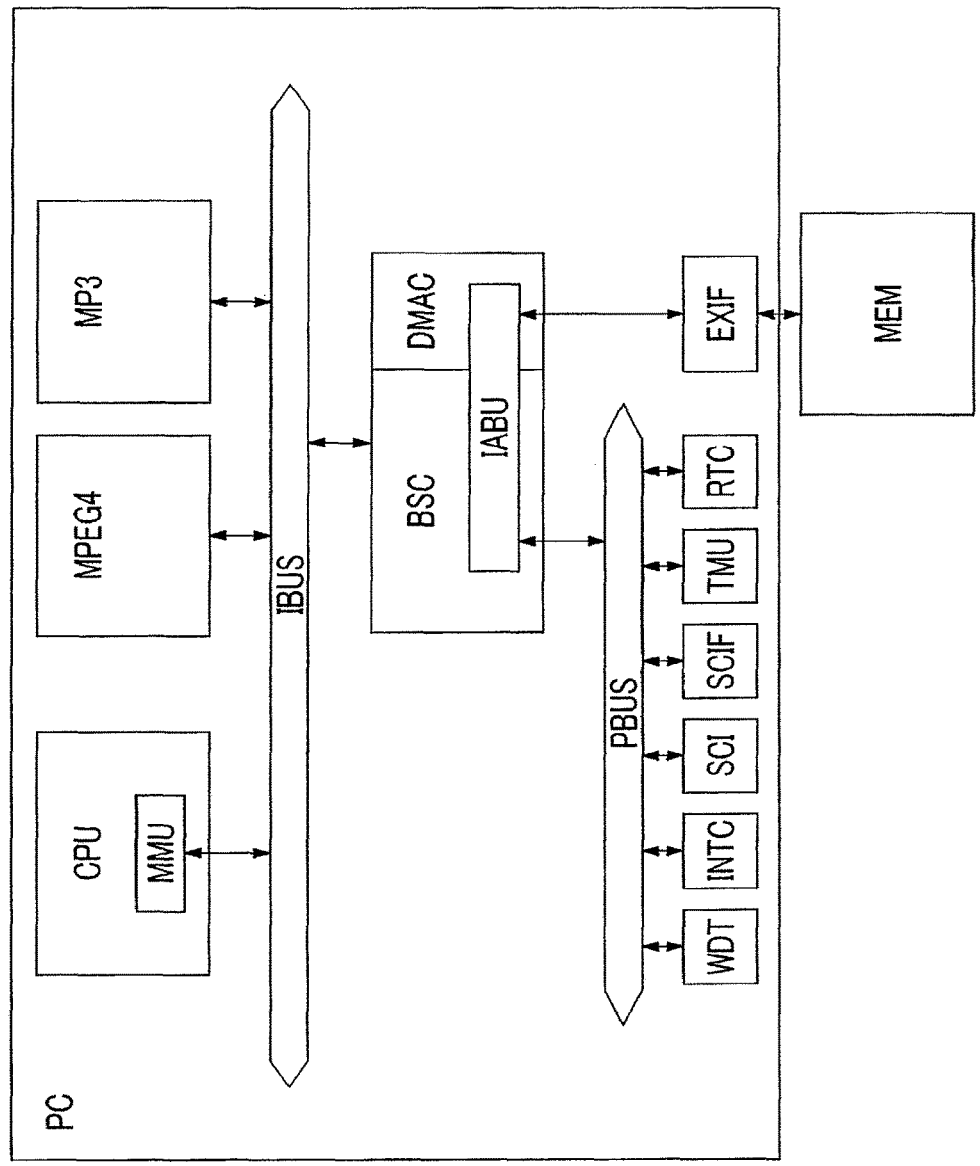
FIG. 9 is a block diagram of the processor for the illegal address access blocking circuit of the second embodiment.
Figure 10:
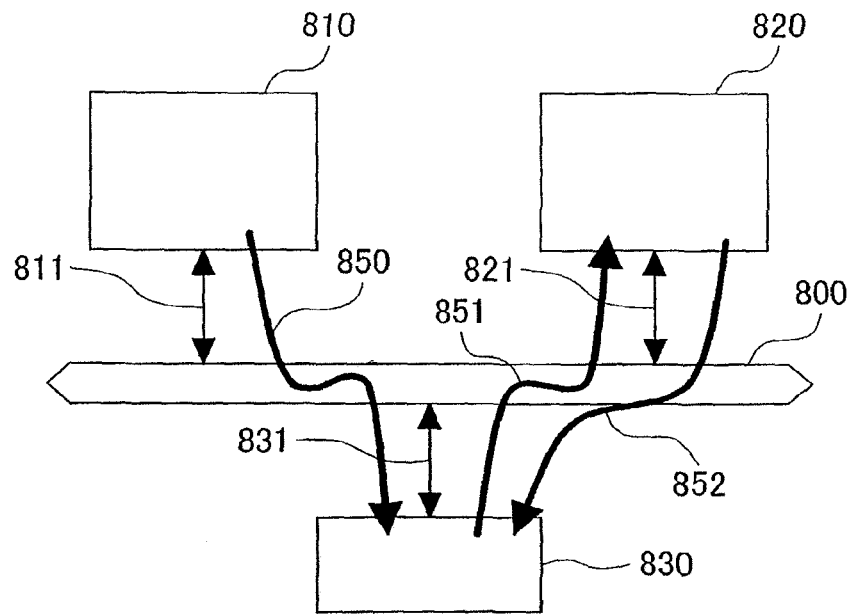
FIG. 10 is a block diagram of a system with multiple bus masters.
Figure 11:
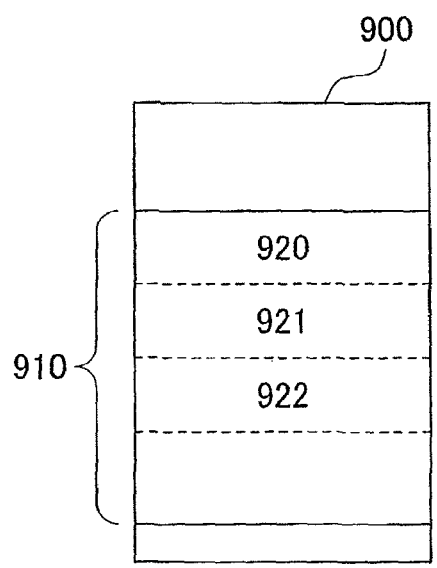
FIG. 11 is a diagram of the memory map for the system shown in FIG. 10.

FIG. 9 is a block diagram of a processor representative of the second embodiment of the present invention. This drawing differs from FIG. 8 in that a processor internal peripheral network (or PBUS) is connected to the peripheral circuit (slave device) separate from the processor internal main network (IBUS). The processor internal peripheral network (PBUS) and processor internal main network (IBUS) are connected by way of a bus state controller BSC. Using this type of structure allows the peripheral circuits that constitute the slave device to connect to the bus master device by way of a bus state controller containing a direct memory access controller DMAC. The processor PC in FIG. 8 has a structure where the peripheral circuits are directly accessed by way of the processor internal main network (IBUS) so, that the illegal address access blocking circuit must be installed in each slave device within each bus master device. However, in the present embodiment, the peripheral circuit is connected to the bus master device by way of the bus state controller so that the illegal address access blocking circuits can be concentrated in the bus state controller and, therefore, take up a smaller area than the processor PC in FIG. 8.

The present invention was described will reference to specific embodiments, however a range of diverse adaptations are possible without departing from the objects of the invention. For example, the values indicating the address range can be hardwired in without installing a register.

What is claimed is:
1. An illegal address access blocking circuit comprising:
 a bus master;
 a bus slave;

a first register configured to set an upper limit value of an address range within which an access from the bus master to the bus slave is allowed;

a second register configured to set a lower limit value of the address range within which the access from the bus master to the bus slave is allowed;

a first comparator configured to compare a first address which is output from the bus master and the upper limit value stored in the first register, and to output a low level signal as a first signal when the first address is larger than the upper limit value;

a second comparator configured to compare the first address which is output from the bus master and the lower limit value stored in the second register, and to output a low level signal as a second signal when the first address is smaller than the lower limit value;

a first logic circuit configured to:
  hold a logic sum of the first signal which is output from the first comparator and the second signal which is output from the second comparator, and
  output the logic sum as a third signal; and a second logic circuit configured to:
  compare a request signal which is output from the bus master and the third signal which is output from the first logic circuit, and
  judge whether the access from the bus master to the bus slave is allowable based on a result of the comparison by itself.

2. The illegal address access blocking circuit according to claim 1,
wherein the third output is further provided to the bus master.

3. The illegal address access blocking circuit according to claim 1,
wherein the first logic circuit is comprised of an AND gate and the second logic circuit is comprised of an AND gate.

4. The illegal address access blocking circuit according to claim 3,
wherein the first and second registers are respectively set to provide the upper limit value in the lower limit value by a control line.

5. The illegal address access blocking circuit according to claim 3,
wherein the first and second registers are set to provide the upper limit value and the lower limit value, respectively, when power to the illegal address access blocking circuit is turned on.

6. The illegal address access blocking circuit according to claim 1, further comprising:
a system bus configured to comprise a plurality of control lines which are shared by a plurality of bus devises
wherein the bus master accesses and sends responses to the bus slave via the system bus.

7. The illegal address access blocking circuit according to claim 1, wherein
the first register, the second register, the first comparator, the second comparator, the first logic, and the second logic are included in the bus master.

* * * * *